US012100890B2

(12) United States Patent
Jia et al.

(10) Patent No.: US 12,100,890 B2
(45) Date of Patent: Sep. 24, 2024

(54) LIQUID CRYSTAL ANTENNA AND MANUFACTURING METHOD THEREFOR

(71) Applicant: Shanghai AVIC Optoelectronics Co., Ltd., Shanghai (CN)

(72) Inventors: Zhenyu Jia, Shanghai (CN); Kerui Xi, Shanghai (CN); Gang Qi, Shanghai (CN); Baiquan Lin, Shanghai (CN); Yi Wang, Shanghai (CN); Feng Qin, Shanghai (CN)

(73) Assignee: Shanghai AVIC Optoelectronics Co., Ltd., Shanghai (CN)

( * ) Notice: Subject to any disclaimer, the term of this patent is extended or adjusted under 35 U.S.C. 154(b) by 0 days.

(21) Appl. No.: 17/788,831

(22) PCT Filed: Dec. 28, 2020

(86) PCT No.: PCT/CN2020/140227
§ 371 (c)(1),
(2) Date: Jun. 24, 2022

(87) PCT Pub. No.: WO2022/116329
PCT Pub. Date: Jun. 9, 2022

(65) Prior Publication Data

US 2024/0063531 A1 Feb. 22, 2024

(30) Foreign Application Priority Data

Dec. 4, 2020 (CN) ......................... 202011409570.8

(51) Int. Cl.
*H01Q 1/36* (2006.01)
*H01Q 1/38* (2006.01)
*H01Q 9/04* (2006.01)

(52) U.S. Cl.
CPC ............... *H01Q 1/364* (2013.01); *H01Q 1/38* (2013.01); *H01Q 9/0414* (2013.01)

(58) Field of Classification Search
CPC .... H01Q 1/36–38; H01Q 9/0414; H01Q 1/22; H01Q 1/243; H01L 27/124
See application file for complete search history.

(56) References Cited

U.S. PATENT DOCUMENTS 10,411,353 B2 * 9/2019 Sugita .................. H01Q 9/0407
11,262,607 B2 * 3/2022 Wang .................. G02F 1/13439
(Continued)

FOREIGN PATENT DOCUMENTS

CN 108493592 A 9/2018
CN 110137636 A 8/2019
(Continued)

OTHER PUBLICATIONS

International Search Report and Written Opinion for PCT/CN2020/140227, dated Aug. 26, 2021, eight (8) pages.

*Primary Examiner* — Hasan Islam
(74) *Attorney, Agent, or Firm* — KDW Firm PLLC

(57) ABSTRACT

Provided are a liquid crystal antenna and a manufacturing method thereof. The liquid crystal antenna includes a first substrate, a second substrate and a third substrate that are stacked. The first substrate and the second substrate constitute a first box-shaped structure. A first space is disposed between the first substrate and the second substrate. The first space is filled with a liquid crystal layer. The second substrate and the third substrate constitute a second box-shaped structure. A second conductive pattern layer is disposed on a side of the second substrate. A third conductive pattern layer is disposed on a single side of the third substrate. A second space is disposed between the second substrate and the third substrate.

20 Claims, 8 Drawing Sheets

(56) References Cited

U.S. PATENT DOCUMENTS

| | | | | |
|---|---|---|---|---|
| 11,469,500 | B2 * | 10/2022 | Yang | H01Q 3/36 |
| 2005/0046782 | A1 | 3/2005 | Kobayashi et al. | |
| 2020/0243969 | A1 | 7/2020 | Fang et al. | |

FOREIGN PATENT DOCUMENTS

| | | | |
|---|---|---|---|
| CN | 110176673 | A | 8/2019 |
| CN | 211507899 | U | 9/2020 |

* cited by examiner

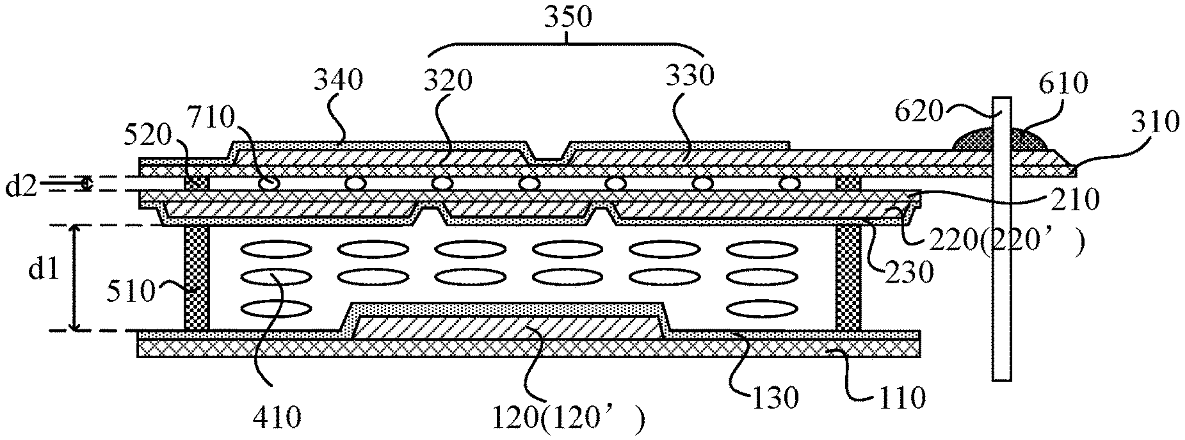

FIG. 16

Provide a first substrate 110, a second substrate 210, and a third substrate 310, where a conductive pattern layer is disposed on each of a single side of the second substrate 210 and a single side of the third substrate 310 — S110

↓

Make the first substrate 110 and the second substrate 210 into a box to constitute a first box-shaped structure, where a first space is disposed between the first substrate 110 and the second substrate 210, and the first space is filled with a liquid crystal layer 410 — S120

↓

Make the second substrate 210 and the third substrate 310 into a box to constitute a second box-shaped structure, where a second space is disposed between the second substrate 210 and the third substrate 310 so that the conductive pattern layer on the second substrate 210 is separated from the conductive pattern layer on the third substrate 310 — S130

FIG. 17

LIQUID CRYSTAL ANTENNA AND MANUFACTURING METHOD THEREFOR

CROSS-REFERENCE TO RELATED APPLICATION

This is a National stage application, filed under 37 U.S.C. 371, of International Patent Application NO. PCT/CN2020/140227, filed on Dec. 28, 2020, which is based on and claims priority to Chinese Patent Application No. 202011409570.8 filed with the China National Intellectual Property Administration (CNIPA) on Dec. 4, 2020, the disclosure of which is incorporated herein by reference in its entirety.

TECHNICAL FIELD

The present disclosure relates to the field of liquid crystal technology, for example, a liquid crystal antenna and a method for manufacturing a liquid crystal antenna.

BACKGROUND

Liquid crystals can flow like liquids; moreover, liquid crystal molecules are oriented in order like roads. Accordingly, liquid crystals have both fluidity and anisotropy. Due to the anisotropy of the liquid crystals, the effective dielectric constant of the liquid crystals is adjustable to achieve the adjustment of wavelength. This enables the application of liquid crystals to extend to the field of radio frequency and expand the development of related industries.

In the related art, a liquid crystal antenna is made of two substrates aligned with each other and attached to each other. Each of the two sides of the upper substrate needs to be patterned and provided with an electrode. The two-sided structure of electrodes leads to the high manufacturing difficulty and low yield of liquid crystal antennas in the related art.

SUMMARY

The present disclosure provides a liquid crystal antenna and a manufacturing method thereof to reduce the manufacturing difficulty of the liquid crystal antenna and improve the yield.

In a first aspect, the present disclosure provides a liquid crystal antenna. The liquid crystal antenna includes a first substrate, a second substrate and a third substrate that are stacked.

The first substrate and the second substrate constitute a first box-shaped structure. A first space is disposed between the first substrate and the second substrate. The first space is filled with a liquid crystal layer.

The second substrate and the third substrate constitute a second box-shaped structure. A second conductive pattern layer is disposed on a single side of the second substrate. A third conductive pattern layer is disposed on a single side of the third substrate. A second space is disposed between the second substrate and the third substrate.

In a second aspect, the present disclosure further provides a method for manufacturing a liquid crystal antenna. The method for manufacturing a liquid crystal antenna includes the steps below.

A first substrate, a second substrate and a third substrate are provided. A second conductive pattern layer is disposed on a single side of the second substrate. A third conductive pattern layer is disposed on a single side of the third substrate.

The first substrate and the second substrate are made into a box to constitute a first box-shaped structure. A first space is disposed between the first substrate and the second substrate. The first space is filled with a liquid crystal layer.

The second substrate and the third substrate are made into a box to constitute a second box-shaped structure. A second space is disposed between the second substrate and the third substrate so that the second conductive pattern layer on the second substrate is separated from the third conductive pattern layer on the third substrate.

BRIEF DESCRIPTION OF DRAWINGS

FIG. 16 is a structure view of another liquid crystal antenna according to embodiments of the present disclosure.

FIG. 17 is a flowchart of a method for manufacturing a liquid crystal antenna according to embodiments of the present disclosure.

DETAILED DESCRIPTION

Figure 1:
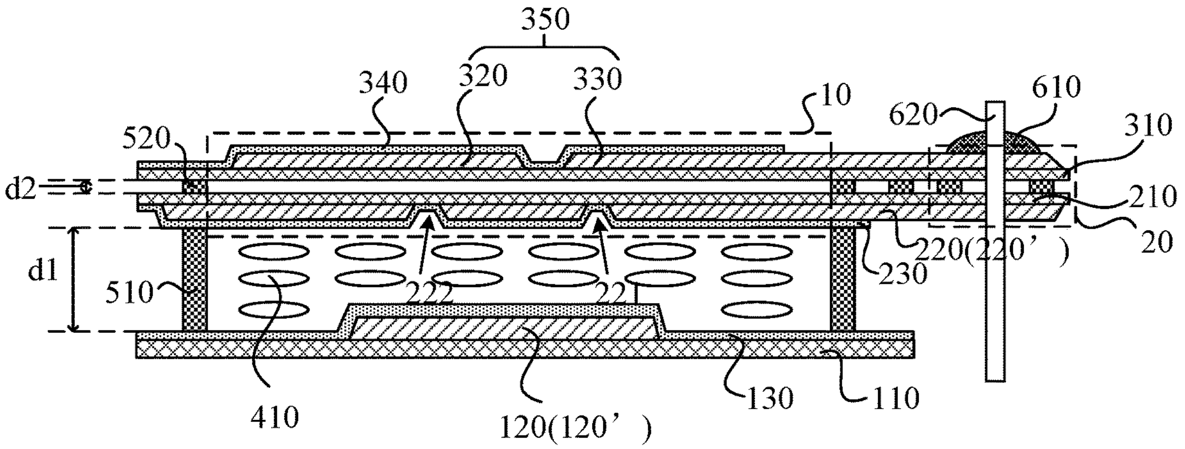
FIG. 1 is a structure view of a liquid crystal antenna according to embodiments of the present disclosure.

Embodiments of the present disclosure provide a liquid crystal antenna. FIG. 1 is a structure view of a liquid crystal antenna according to embodiments of the present disclosure. Referring to FIG. 1, the liquid crystal antenna includes a first substrate 110, a second substrate 210 and a third substrate 310 that are stacked.

The first substrate 110 and the second substrate 210 constitute a first box-shaped structure. A first space (whose width is d1) is disposed between the first substrate 110 and the second substrate 210. The first space is filled with a liquid crystal layer 410. The second substrate 210 and the third substrate 310 constitute a second box-shaped structure. A second conductive pattern layer 220 is disposed on a single side of the second substrate 210. A third conductive pattern layer 350 is disposed on a single side of the third substrate 310. A second space (whose width is d2) is disposed between the second substrate 210 and the third substrate 310.

The material of the first substrate 110, the material of the second substrate 210, the material of the third substrate 310, the material of the second conductive pattern layer, and the material of the third conductive pattern layer are not limited in embodiments of the present disclosure and fall within the scope of the present disclosure as long as a structure of the preceding two-box liquid crystal antenna can be formed. Exemplarily, each of the first substrate 110 and the second substrate 210 may be, for example, a glass substrate, a ceramic substrate, a polyimide substrate or a liquid crystal polymer substrate. The third substrate 310 may be, for example, a glass substrate, a high-frequency substrate (printed circuit board, PCB), a ceramic substrate, a polyimide substrate or a liquid crystal polymer substrate. Each of the second conductive pattern layer and the third conductive pattern layer may be, for example, a metal layer and is a copper layer or a gold layer optionally.

As mentioned in the BACKGROUND, it can be achieved in the process that both sides of the same substrate are provided with copper thin films which are then patterned; however, it is of high difficulty, high cost and low yield. In embodiments of the present disclosure, the second conductive pattern layer 220 is disposed on a single side of the second substrate 210, the third conductive pattern layer 350 is disposed on a single side of the third substrate 310, and the second substrate 210 and the third substrate 310 constitute the second box-shaped structure. This configuration is equivalent to using the second box-shaped structure to replace the structure of forming conductive pattern layers on both sides of the same substrate in the related art. Accordingly, the embodiments of the present disclosure avoid the process of manufacturing conductive pattern layers on both sides of the same substrate, thereby reducing the manufacturing difficulty, reducing the cost and improving the yield. Moreover, compared with the configuration in which the second substrate 210 is directly attached to the third substrate 310, the second space is disposed between the second substrate 210 and the third substrate 310, helping prevent the phenomenon such as a protrusion or a bulge from being generated on a substrate surface due to the manufacturing process or environment, thereby enhancing the reliability and manufacturing quality of the liquid crystal antenna. To sum up, the embodiments of the present disclosure help reduce the manufacturing difficulty of the liquid crystal antenna and improve the yield.

In order to help understand the present disclosure, a structure of the liquid crystal antenna and the working principle thereof are described hereinafter.

Referring to FIG. 1, exemplarily, a first conductive pattern layer 120 on the first substrate 110 is a phase-shifting layer 120'. The second conductive pattern layer 220 on the second substrate 210 is a grounding layer 220'. The phase-shifting layer 120' and the grounding layer 220' together constitute an inner electrode in the first box-shaped structure. An electric field is generated between the phase-shifting layer 120' and the grounding layer 220' and is used for driving liquid crystal molecules to deflect. The second conductive pattern layer 220 on the second substrate 210 includes at least one opening (for example, a first opening 221 and a second opening 222). The at least one opening is configured to couple an antenna signal so that the antenna signal is transmitted between the first substrate 110 and the third substrate 310. The phase-shifting layer 120' may also be referred to as a transmission electrode. The phase-shifting layer 120' is configured to drive liquid crystal molecules to deflect as well as couple and transmit an electromagnetic wave. Optionally, a first protective layer 130 is disposed on one side of the phase-shifting layer 120' facing away from the first substrate 110. The first protective layer 130 plays the role of protecting the phase-shifting layer 120' and also has functions including insulation and oxidation resistance. A second protective layer 230 is disposed on one side of the grounding layer 220' facing away from the second substrate 210. The second protective layer 230 is configured to protect the grounding layer 220' and also has functions including insulation and oxidation resistance. Exemplarily, the grounding layer 220' includes a first opening 221 and a second opening 222. Both the vertical projection of the first opening 221 on the first substrate 110 and the vertical projection of the second opening 222 on the first substrate 110 overlap the phase-shifting layer 120'.

The third conductive pattern layer 350 on the third substrate 310 includes a feed pattern block 330 and a radiation pattern block 320. The feed pattern block 330 is electrically connected to an antenna connector 620. The vertical projection of the feed pattern block 330 on the first substrate 110 overlaps the vertical projection of the first opening 221 on the first substrate 110. The radiation pattern block 320 is configured to radiate or receive an antenna signal. The vertical projection of the radiation pattern block 320 on the first substrate 110 overlaps the vertical projection of the second opening 222 on the first substrate 110.

Accordingly, only one side of the second substrate 210 is provided with the grounding layer 220', and only one side of the third substrate 310 is provided with the feed pattern block 330 and the radiation pattern block 320. That is, a conductive pattern layer is disposed on each of a single side of the second substrate 210 and a single side of the third substrate 310. Compared with the manufacturing method of manufacturing a grounding layer, a feed pattern block and a radiation pattern block sequentially on both sides of the same substrate in the related art, this method greatly simplifies the manufacturing process, reduces process difficulty, and reduces the manufacturing cost. Additionally, in the embodiments of the present disclosure, the second space is disposed between the second substrate 210 and the third substrate 310 to form the second box-shaped structure so that particles in the environment are prevented from being interspersed between the second substrate 210 and the third substrate 310 in the manufacturing process to cause a protrusion or a bulge, the third substrate 310 is prevented from being adversely affected by an uneven surface of the second substrate 210, and the second substrate 210 is prevented from being adversely affected by an uneven surface of the third substrate 310. Accordingly, compared with the configuration in which the second substrate 210 is directly attached to the third substrate 310, the embodiments of the present disclosure help enhance the performance of the liquid crystal antenna and improve the yield.

Referring to FIG. 1, optionally, a third protective layer 340 is disposed on one side of the feed pattern block 330 and radiation pattern block 320 facing away from the third substrate 310. The third protective layer 340 is configured to protect the feed pattern block 330 and the radiation pattern block 320 and also has functions including insulation and oxidation resistance.

Referring to FIG. 1, optionally, an antenna connector 620 and a pad 610 are disposed on one end of the feed pattern block 330 facing away from the radiation pattern block 320. A first end of the antenna connector 620 is connected to the feed pattern block 330 and is fixed through the pad 610. A second end of the antenna connector 620 is configured to be connected to an external circuit, for example, a high-frequency connector. The antenna connector 620 may be an antenna coaxial-cable connector.

Exemplarily, the working principle of the liquid crystal antenna is as follows: in the process of emitting an antenna signal (for example, an electromagnetic wave), getting coupled to the feed pattern block 330 through the antenna connector 620; coupling, by the feed pattern block 330, the electromagnetic wave from the first opening 221 to the phase-shifting layer 120'; changing the phase of the electromagnetic wave through changing the dielectric constant of the liquid crystal layer 410; coupling the electromagnetic wave with the changed phase to the radiation pattern block 320 through the second opening 222; and radiating, by the radiation pattern block 320, the electromagnetic wave outward so as to complete the emission process of the antenna signal. The step in which the feed pattern block 330 couples the electromagnetic wave from the first opening 221 to the phase-shifting layer 120' is affected by the dielectric constant of the third substrate 310, the dielectric constant of the second space, the dielectric constant of the second substrate 210 and the dielectric constant of the first substrate 110. The process of receiving an antenna signal is contrary to the process of emitting an antenna signal and is not repeated here.

It is to be noted that FIG. 1 exemplarily illustrates that the phase-shifting layer 120' is disposed on the first substrate 110 and the grounding layer 220' is disposed on the second substrate 210 so as to generate a longitudinal electric field for driving a liquid crystal molecule to deflect. This is not a limit to the present disclosure. In other embodiments, the phase-shifting layer 120' and the grounding layer 220' may also be both disposed on the first substrate 110 (or the second substrate 210) so as to generate a transverse electric field for driving liquid crystal molecules to deflect, which can be set as needed in the practical application.

Optionally, the liquid crystal antenna further includes a frame sealant 520. The frame sealant 520 is used for sealing the second box-shaped structure and supporting the second substrate 210 and the third substrate 310 to form the second space. There are various ways of setting the frame sealant 520, some of which will be described below, but are not intended to limit the present disclosure.

Referring to FIG. 1, in one embodiment, optionally, the second box-shaped structure includes a liquid crystal overlapping region 10 and a wiring region 20. The wiring region 20 protrudes from the first box-shaped structure. The wiring region 20 is configured to weld the antenna connector 620. Part of the frame sealant 520 surrounds the liquid crystal overlapping region 10, and part of the frame sealant 520 adheres the second substrate 210 and the third substrate 310 together in the wiring region 20. The frame sealant 520 surrounding the liquid crystal overlapping region 10 are used for sealing the liquid crystal overlapping region 10 of the second box-shaped structure and supporting the second substrate 210 and the third substrate 310 to form the second space. The frame sealant 520 located in the wiring region 20 equivalently provides an adhesive point of the second substrate 210 and the third substrate 310, helping prevent an end of the second box-shaped structure from, for example, cracking and falling off. Thus this configuration helps enhance the performance and quality of the liquid crystal antenna.

Figure 2:
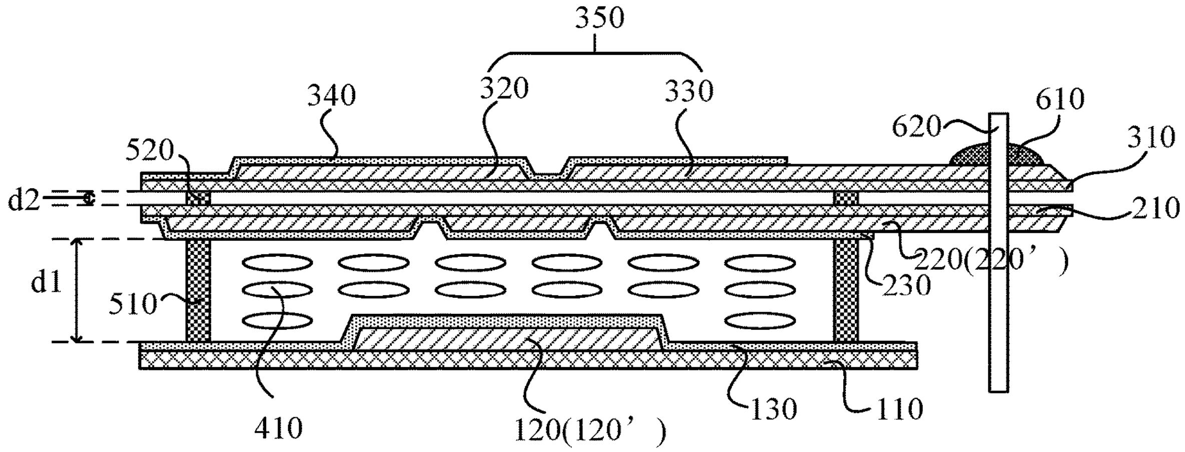
FIG. 2 is a structure view of another liquid crystal antenna according to embodiments of the present disclosure.

FIG. 2 is a structure view of another liquid crystal antenna according to embodiments of the present disclosure. Referring to FIG. 2, in one embodiment, optionally, the frame sealant 520 surrounds only the liquid crystal overlapping region 10. Compared with the preceding embodiments, this configuration reduces the material cost and simplifies the manufacturing process.

Figure 3:
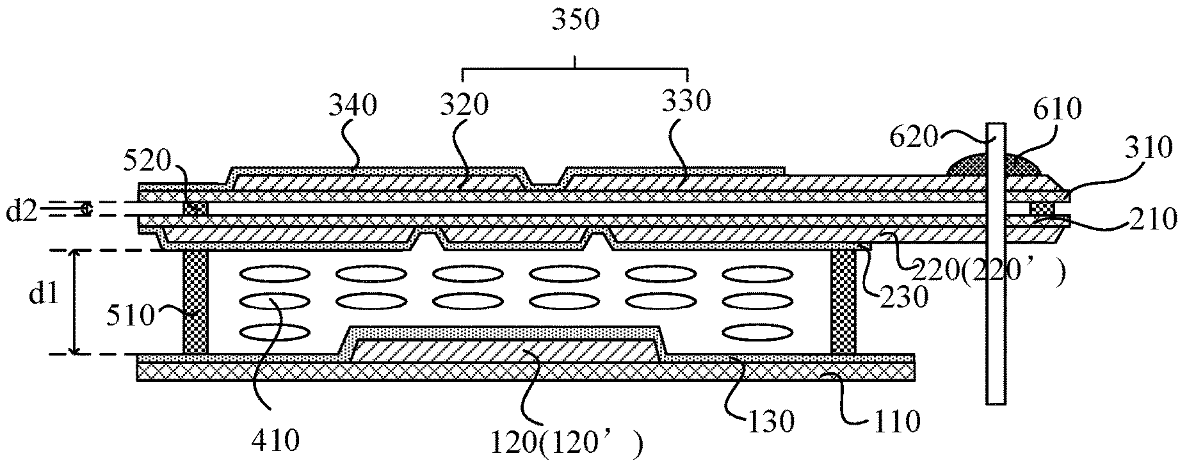
FIG. 3 is a structure view of another liquid crystal antenna according to embodiments of the present disclosure.

FIG. 3 is a structure view of another liquid crystal antenna according to embodiments of the present disclosure. Referring to FIG. 3, in one embodiment, optionally, the frame sealant 520 surrounds both the liquid crystal overlapping region 10 and the wiring region 20. Compared with the preceding embodiments, this configuration helps implement the sealing for the second box-shaped structure in a relatively large range by using less frame sealant 520.

Figure 4:
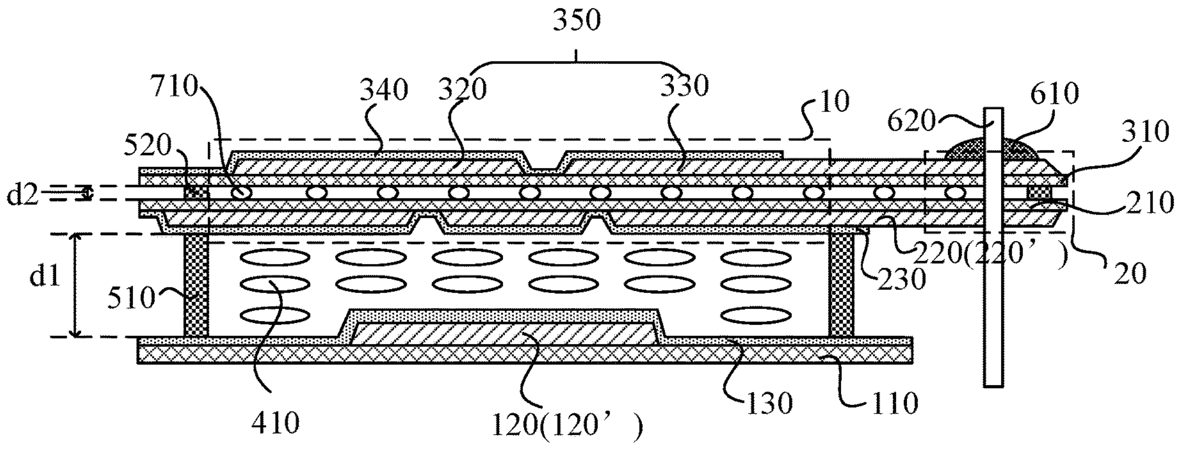
FIG. 4 is a structure view of another liquid crystal antenna according to embodiments of the present disclosure.

FIG. 4 is a structure view of another liquid crystal antenna according to embodiments of the present disclosure. Referring to FIG. 4, optionally, the liquid crystal antenna further includes support structures 710. The support structures 710 are disposed in the second space. A first end of each support structure 710 abuts against the second substrate. A second end of each support structure 710 abuts against the third substrate 310. The vertical projections of the support structures 710 on the second substrate 210 do not overlap the at least one opening 221, 222 of the second conductive pattern layer 220 on the second substrate 210. This configuration in embodiments of the present disclosure is equivalent to providing multiple fixed points in the second box-shaped structure, enabling the second space at each position of the second box-shaped structure to keep constant, thereby enhancing the stability of the second box-shaped structure, helping prevent the performance of the liquid crystal antenna from being affected by the collapse and deformation of the second box-shaped structure during the use of the liquid crystal antenna, and helping avoid the adverse effect on the radiation performance of the liquid crystal antenna due to the defect of a small protrusion on the second substrate 210 or third substrate 310.

There are various ways of setting the support structures 700, some of which will be described below, but are not intended to limit the present disclosure.

Referring to FIG. 4, in one embodiment, optionally, the support structures 700 are support balls. The support balls are made of, for example, an organic material or an inorganic material. Exemplarily, the support balls are distributed in the form of spraying in the range that is sealed by the frame sealant 520 and is in the second space. The support balls are used for supporting the second substrate 210 and the third substrate 310. Exemplarily, when the frame sealant 520 surrounds only the liquid crystal overlapping region 10, the support balls are distributed only in the liquid crystal overlapping region 10 in the second space; when the frame sealant 520 surrounds both the liquid crystal overlapping region 10 and the wiring region 20, the support balls may be distributed in both the liquid crystal overlapping region 10 and the wiring region 20 in the second space.

Figure 5:
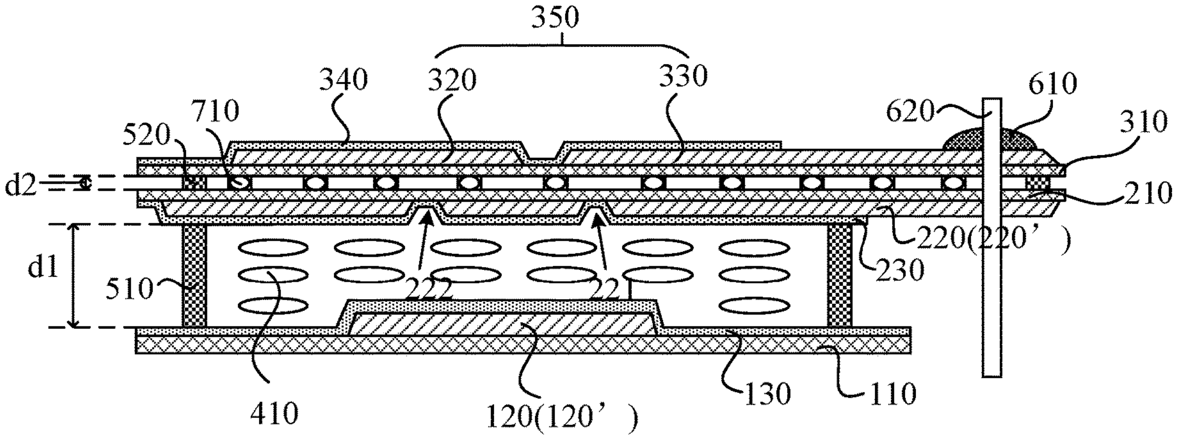
FIG. 5 is a structure view of another liquid crystal antenna according to embodiments of the present disclosure.

FIG. 5 is a structure view of another liquid crystal antenna according to embodiments of the present disclosure. Referring to FIG. 5, in one embodiment, optionally, the support structures 700 are frame sealant mixed support balls. The difference between the structure of the frame sealant mixed support balls and the structure of the support balls lies in that the positions of the support balls in the second space are not fixed, while for the frame sealant mixed support balls, the support balls can be fixed by using the frame sealant to wrap the support balls so that the positions of the support structures 710 are controllable. This configuration has the advantage of enabling the positions of the support structures 710 to avoid the first opening 221 and the second opening 222 while ensuring the support effect, thereby enhancing the performance of the liquid crystal antenna. This is because the first opening 221 and the second opening 222 are configured to couple an antenna signal so that the antenna signal is transmitted between the first substrate 110 and the third substrate 310. If the vertical projections of the support structures 710 on the second substrate 210 overlap an opening, which indicates that the support structures 710 block the first opening 221 or the second opening 222, the dielectric constant of the antenna signal may be affected in the transmission process, thereby increasing the loss.

Figure 6:
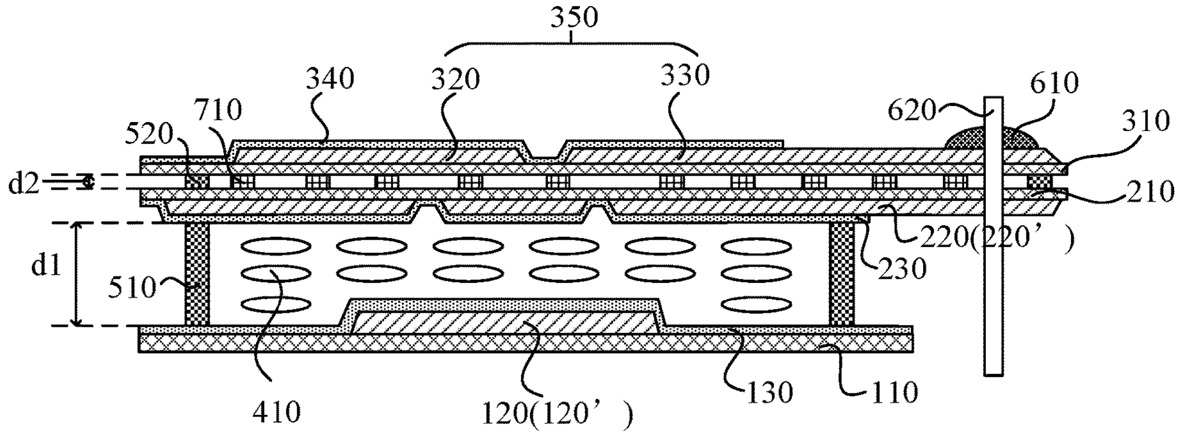
FIG. 6 is a structure view of another liquid crystal antenna according to embodiments of the present disclosure.

FIG. 6 is a structure view of another liquid crystal antenna according to embodiments of the present disclosure. Referring to FIG. 6, in one embodiment, optionally, the support structures 700 are support columns. Similar to the frame sealant mixed support balls, the positions of the support columns are controllable, which enables the positions of the support structures 710 to avoid the first opening 221 and the second opening 222 while ensuring the support effect, thereby enhancing the performance of the liquid crystal antenna. Exemplarily, the support columns may be manufactured by exposure. For example, organic photosensitive glue is coated on one side of the second substrate 210 facing away from the grounding layer 220'; then the positions of the support columns are etched by exposure; and then the support columns are filled. In another example, the base materials of the support columns are formed on the second substrate 210 or the third substrate 310, and then the support columns are formed through the photolithography process.

Figure 7:
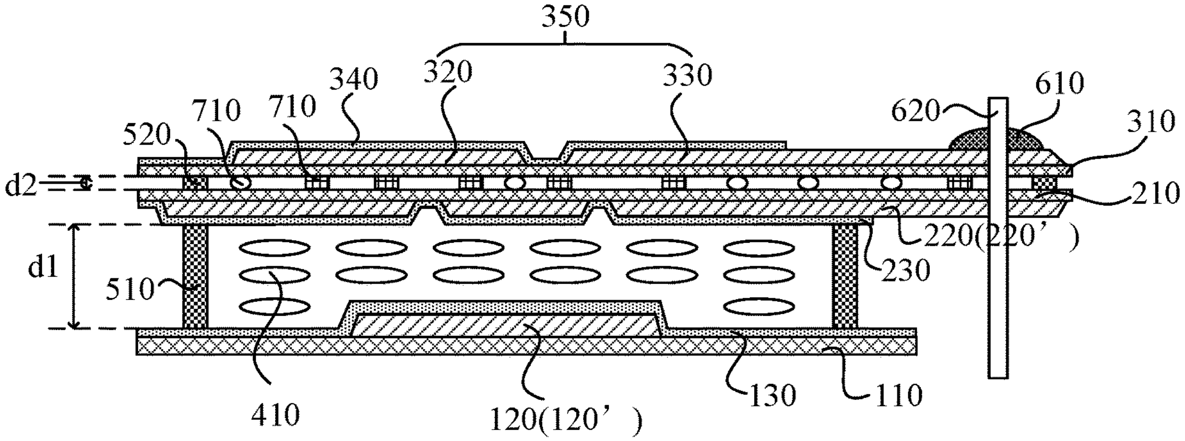
FIG. 7 is a structure view of another liquid crystal antenna according to embodiments of the present disclosure.

FIG. 7 is a structure view of another liquid crystal antenna according to embodiments of the present disclosure. Referring to FIG. 7, in one embodiment, the support structures 710 include support columns and support balls. Since the positions of the support columns are controllable, the support columns may be manufactured first, avoiding the positions of the openings on the grounding layer 220'. Then the support balls are sprayed at other positions to ensure that the vertical projections of the support structures 710 on the second substrate 210 do not overlap the openings.

To sum up, the support structures 710 provided in embodiments of the present disclosure include at least one of support balls, support columns or frame sealant mixed support balls. The support structures 710 are disposed in at least one of the liquid crystal overlapping region 10 or the wiring region 20. The materials, shapes, and positions of the support structures 710 may be flexibly set as needed.

Referring to FIGS. 1 to 7, optionally, the liquid crystal antenna further includes a first support piece 510. The first support piece 510 may be, for example, a frame sealant. When the first substrate 110 and the second substrate 210 form the first box-shaped structure, the first substrate 110 and the second substrate 210 are supported through the first support piece 510 in the first space. Moreover, the first support piece 510 surrounds the liquid crystal layer 410 and are further configured to seal the first box-shaped structure to prevent the liquid crystal layer 410 from overflowing.

Optionally, the liquid crystal antenna further includes second support pieces (not shown in the figure). The second support pieces are disposed in the first box-shaped structure and are configured to support the first substrate 110 and the second substrate 210. The second support pieces may be, for example, support balls or support columns (photo spacer (PS) columns).

Figure 8:
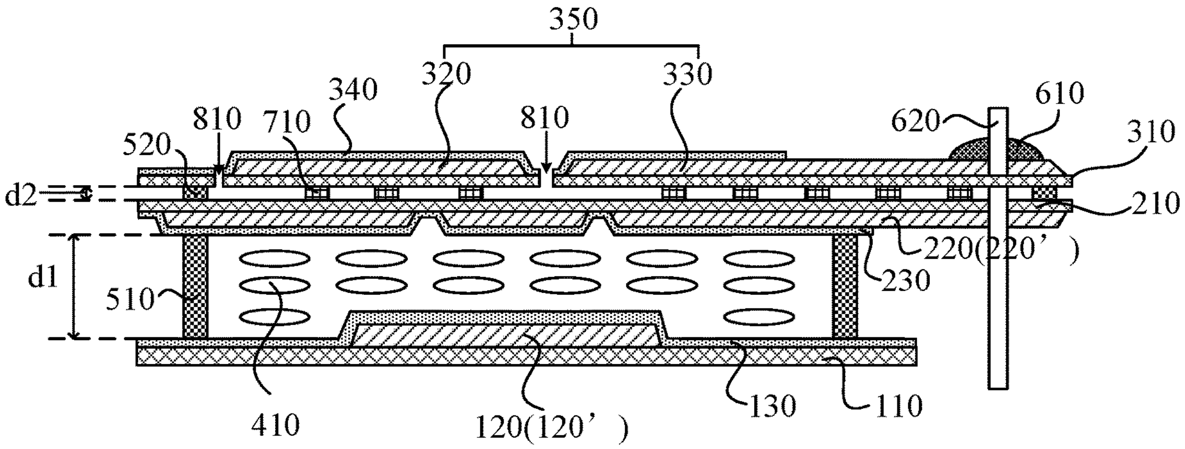
FIG. 8 is a structure view of another liquid crystal antenna according to embodiments of the present disclosure.

FIG. 8 is a structure view of another liquid crystal antenna according to embodiments of the present disclosure. Referring to FIG. 8, optionally, the third conductive pattern layer 350 on the third substrate 310 includes a plurality of conductive pattern blocks 320, 330 insulated from each other. Exemplarily, the radiation pattern block 320 and the feed pattern block 330 are insulated from each other. The third substrate includes a hollow portion 810. The hollow portion 810 is located in a region between two adjacent conductive pattern blocks. Alternatively, the hollow portion 810 is located between the edge of the third substrate 310 and the conductive pattern blocks. FIG. 8 exemplarily illustrates that a hollow portion 810 is located between the radiation pattern block 320 and the edge of the third substrate 310 and a hollow portion 810 is located between the radiation pattern block 320 and the feed pattern block 330. The hollow portions 810 can serve as the alignment marks of the third substrate 310, helping enhance the alignment accuracy when the second substrate 210 and the third substrate 310 are made into a box, thereby helping reduce the manufacturing difficulty of the liquid crystal antenna and enhance the quality of the liquid crystal antenna.

Embodiments of the present disclosure provide the hollow portion 810 as the alignment mark by cleverly utilizing the structural characteristics that the radiation pattern block 320 and the feed pattern block 330 on the third substrate 310 are insulated from each other in the second box-shaped structure. The setting of the hollow portion 810 has relatively high freedom. Further, a plurality of hollow portions 810 may be provided as needed, which reduces the manufacturing difficulty of the liquid crystal antenna on the whole.

It is to be noted that the shape of the hollow portion 810 is not limited in the embodiments of the present disclosure. Optionally, the hollow portion 810 may be, for example, linear, star-shaped, triangular or cross-shaped and can be set as needed in the practical application.

It is to be further noted that each preceding embodiment exemplarily shows one way of setting the relative position of the second conductive pattern layer 220 (the grounding layer 220') on the second substrate 210 to the third conductive pattern layer 350 (the radiation pattern block 320 and the feed pattern block 330) on the third substrate 310. That is, the second conductive pattern layer 220 on the second substrate 210 is located on one side of the second substrate 210 facing away from the third substrate 310, and the third conductive pattern layer 350 on the third substrate 310 is located on one side of the third substrate 310 facing away from the second substrate 210, which is not intended to limit the present disclosure. In other embodiments, there are various ways of setting the relative position of the second conductive pattern layer 220 on the second substrate 210 to the third conductive pattern layer 350 on the third substrate 350, some of which will be described below, but are not intended to limit the present disclosure.

Figure 9:
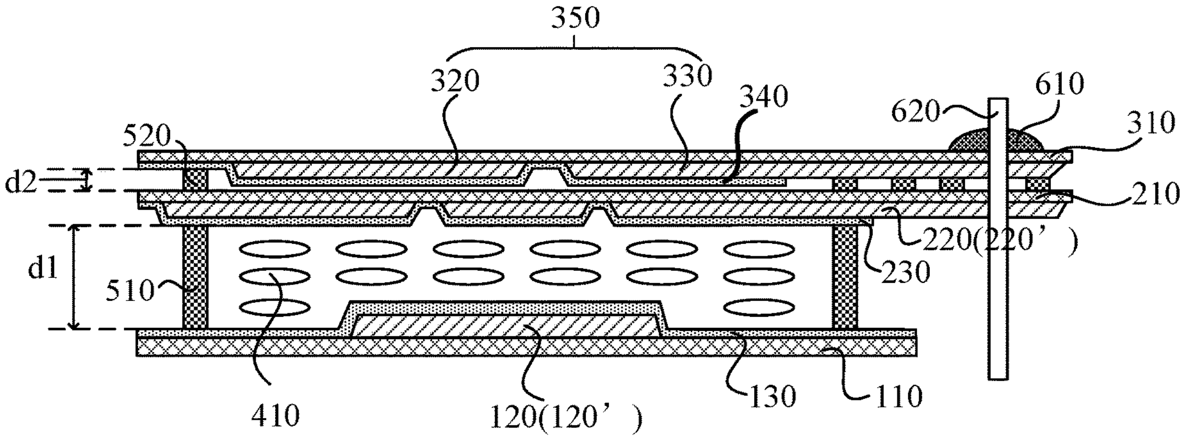
FIG. 9 is a structure view of another liquid crystal antenna according to embodiments of the present disclosure.

FIG. 9 is a structure view of another liquid crystal antenna according to embodiments of the present disclosure. Referring to FIG. 9, in one embodiment, optionally, the second conductive pattern layer 220 on the second substrate 210 is located on one side of the second substrate 210 facing away from the third substrate 310, and the third conductive pattern layer 350 on the third substrate 310 is located on one side of the third substrate 310 facing the second substrate 210.

Figure 10:
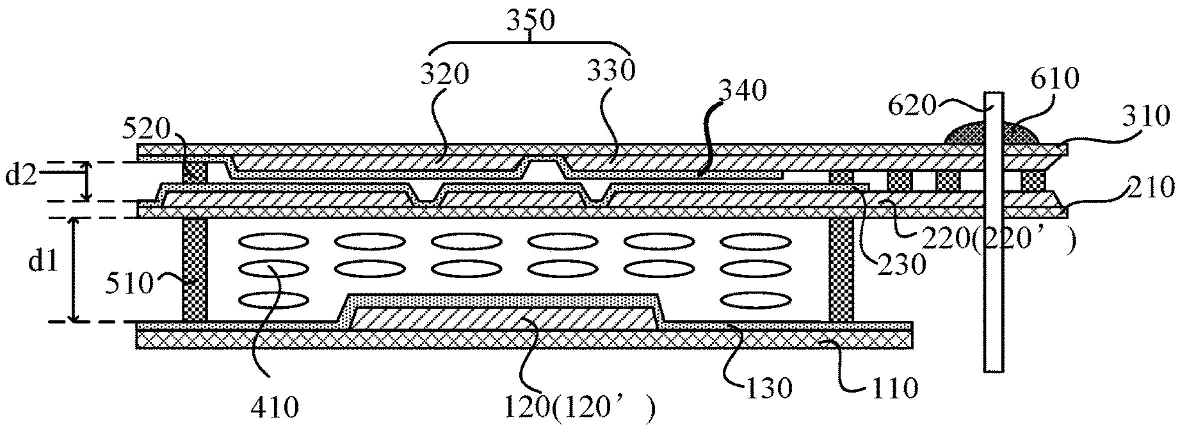
FIG. 10 is a structure view of another liquid crystal antenna according to embodiments of the present disclosure.

FIG. 10 is a structure view of another liquid crystal antenna according to embodiments of the present disclosure. Referring to FIG. 10, in one embodiment, optionally, the second conductive pattern layer 220 on the second substrate 210 is located on one side of the second substrate 210 facing the third substrate 310, and the third conductive pattern layer 350 on the third substrate 310 is located on one side of the third substrate 310 facing the second substrate 210.

Figure 11:
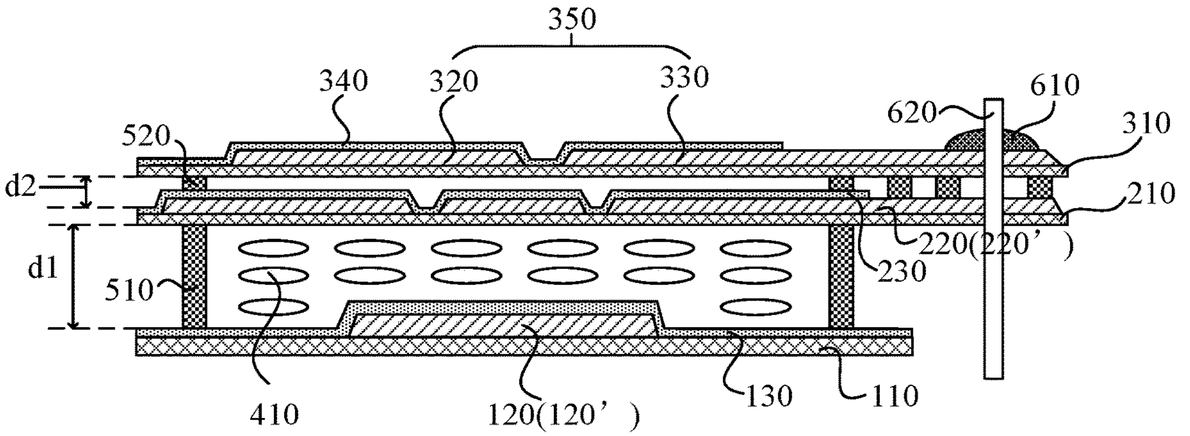
FIG. 11 is a structure view of another liquid crystal antenna according to embodiments of the present disclosure.

FIG. 11 is a structure view of another liquid crystal antenna according to embodiments of the present disclosure. Referring to FIG. 11, in one embodiment, optionally, the second conductive pattern layer 220 on the second substrate 210 is located on one side of the second substrate 210 facing the third substrate 310, and the third conductive pattern layer 350 on the third substrate 310 is located on one side of the third substrate 310 facing away from the second substrate 210.

Accordingly, the embodiments of the present disclosure flexibly provide various ways of setting the relative position of the second conductive pattern layer 220 on the second substrate 210 to the third conductive pattern layer 350 on the third substrate 350, each of which can implement the functions of the liquid crystal antenna. The relative position can be set as needed in the practical manufacturing.

Optionally, the second space in the second box-shaped structure is evacuated or is filled with air. The way in which the second space is evacuated helps reduce the dielectric constant and electromagnetic loss of an electromagnetic wave in the process of signal transmission. The way in which the second space is filled with air helps simplify the process steps and reduce the process difficulty without the need of evacuating the second box-shaped structure.

Optionally, a dielectric material layer may also be provided in the second box-shaped structure to adjust the feed performance of the liquid crystal antenna. There are various ways of setting the dielectric material layer, some of which will be described below, but are not intended to limit the present disclosure.

Figure 12:
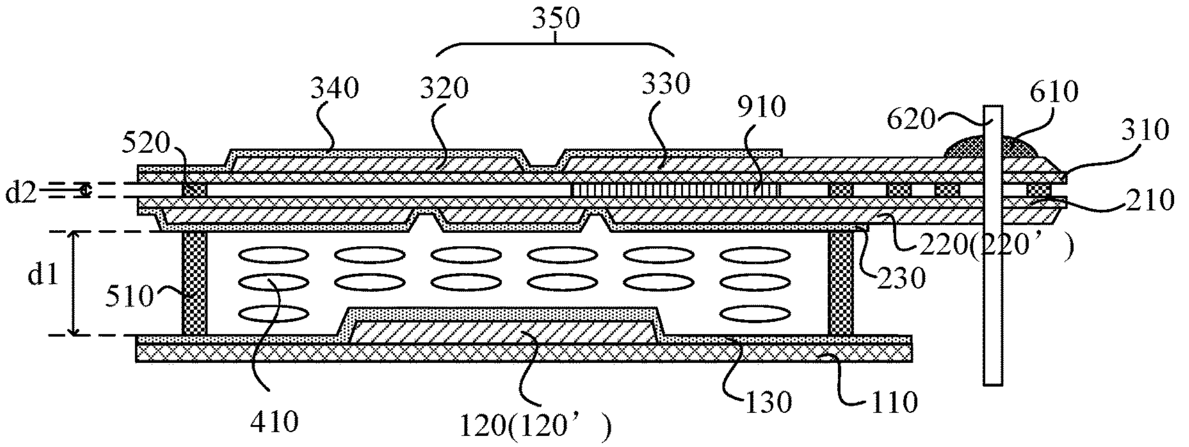
FIG. 12 is a structure view of another liquid crystal antenna according to embodiments of the present disclosure.

FIG. 12 is a structure view of another liquid crystal antenna according to embodiments of the present disclosure. Referring to FIG. 12, in one embodiment, optionally, the liquid crystal antenna further includes a first dielectric material layer 910. The first dielectric material layer 910 is located between the second substrate 210 and the third substrate 310. The vertical projection of the first dielectric material layer 910 on the third substrate 310 overlaps the feed pattern block 330. The vertical projection of the first dielectric material layer 910 on the third substrate 310 does not overlap the radiation pattern block 320.

As one of the important parameters affecting the performance of the liquid crystal antenna, the dielectric constant of a medium substrate has an important effect on the radiation performance of the antenna and the performance of the antenna feed network.

As for the substrate in the region where the feed pattern block 330 is located, a larger dielectric constant indicates a stronger ability of a medium confining the electric field and a lower electromagnetic leakage thereof, helping reduce the size of the feed pattern block 330. However, as for the radiation pattern block 320, a larger dielectric constant indicates a stronger ability of a medium confining the electric field, resulting in that more energy is constrained, less energy is radiated effectively, and thus lower radiation efficiency and gain of the liquid crystal antenna is generated.

The first dielectric material layer 910 is disposed in the projection range in the region where the feed pattern block 330 is located. The third substrate 310, the first dielectric material layer 910, and the second substrate 210 as a whole may be regarded as the medium substrate of the feed pattern block 330. The third substrate 310, air (or vacuum), and the second substrate 210 as a whole may be regarded as the medium substrate of the radiation pattern block 320. Compared with air and vacuum, the dielectric constant of the first dielectric material layer 910 is larger. Accordingly, the dielectric constant of the medium substrate of the feed pattern block 330 is larger than the dielectric constant of the medium substrate of the radiation pattern block 320. Thus on the basis of helping enhance the radiation efficiency and gain of the radiation pattern block 320 of the liquid crystal antenna, this configuration helps enhance the ability of the medium substrate of the feed pattern block 330 confining the electric field, mitigate electromagnetic leakage, and reduce the size of the feed pattern block 330.

Optionally, the dielectric constant of the first dielectric material layer 910 is larger than the dielectric constant of the second substrate 210; moreover, the dielectric constant of the first dielectric material layer 910 is larger than the dielectric constant of the third substrate 310. Accordingly, the dielectric constant of the medium substrate of the feed pattern block 330 is enlarged, enhancing the ability of the medium substrate of the feed pattern block 330 confining the electric field, mitigating electromagnetic leakage, and reducing the size of the feed pattern block 330. Optionally, the material of the first dielectric material layer 910 includes at least one of ceramic or lead zirconate titanate.

Figure 13:
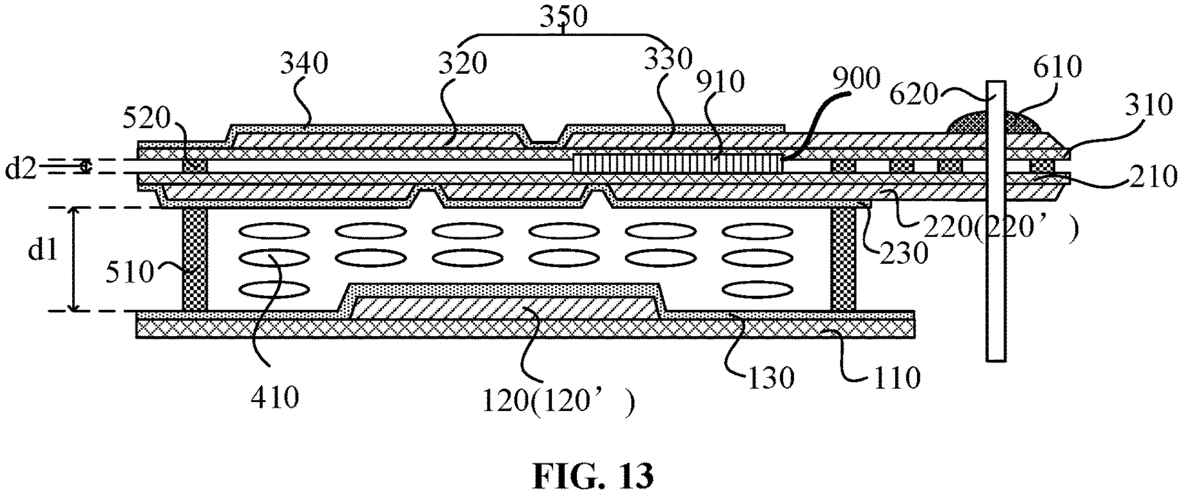
FIG. 13 is a structure view of another liquid crystal antenna according to embodiments of the present disclosure.

FIG. 13 is a structure view of another liquid crystal antenna according to embodiments of the present disclosure. Referring to FIG. 13, in one embodiment, optionally, a first recess 900 is disposed at the position of the third substrate 310 corresponding to the feed pattern block 330. The first dielectric material layer 910 is embedded in the first recess 900. On one hand, this configuration helps fix the first dielectric material layer 910 at the position where the first dielectric material layer 910 overlaps the feed pattern block 300 and prevent the first dielectric material layer 910 from moving due to the unstable position. On the other hand, the thickness of the third substrate 310 is reduced at the first recess 900; correspondingly, the thickness of the first dielectric material layer 910 may be increased. Accordingly, on the basis of not increasing the thickness of the liquid crystal antenna, this configuration helps increase the dielectric constant of the entire medium substrate corresponding to the feed pattern block 330 and reduce the size of the feed pattern block 330.

Figure 14:
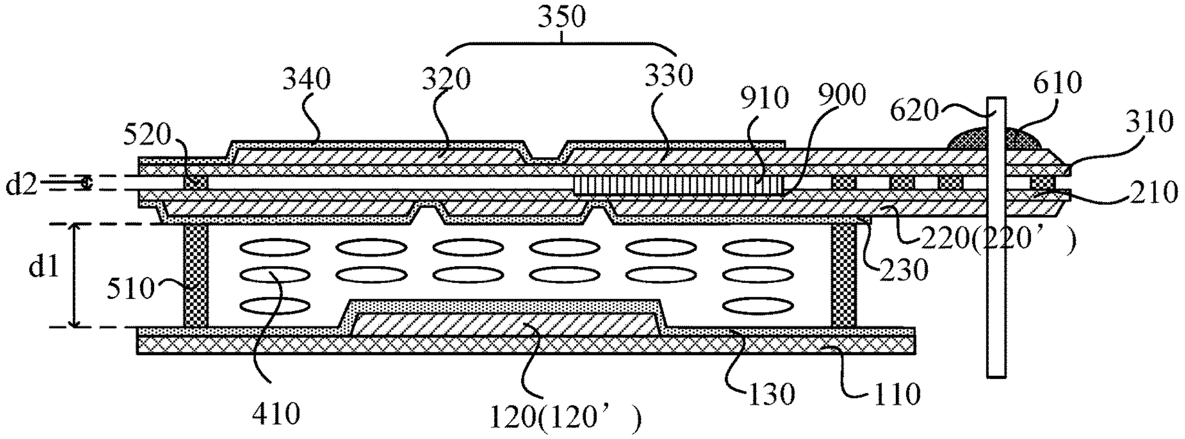
FIG. 14 is a structure view of another liquid crystal antenna according to embodiments of the present disclosure.

FIG. 14 is a structure view of another liquid crystal antenna according to embodiments of the present disclosure. Referring to FIG. 14, in one embodiment, optionally, a first recess 900 is disposed at the position of the second substrate 210 corresponding to the feed pattern block 330. The first dielectric material layer 910 is embedded in the first recess 900. Accordingly, different from the preceding embodiment in which the first recess 900 is disposed on the third substrate 310, the first recess 900 in this embodiment is disposed on the second substrate, which can achieve the same effect as the preceding embodiment.

Combining the two preceding embodiments, in one embodiment, optionally, a first recess is disposed at the position of the second substrate 210 corresponding to the feed pattern block 330, a second recess is disposed at the position of the third substrate 310 corresponding to the feed pattern block 330, and the first dielectric material layer 910 is embedded in the first recess and the second recess. This configuration helps fix the position of the dielectric material layer 910 and increase the dielectric constant of the entire medium substrate corresponding to the feed pattern block 330.

Figure 15:
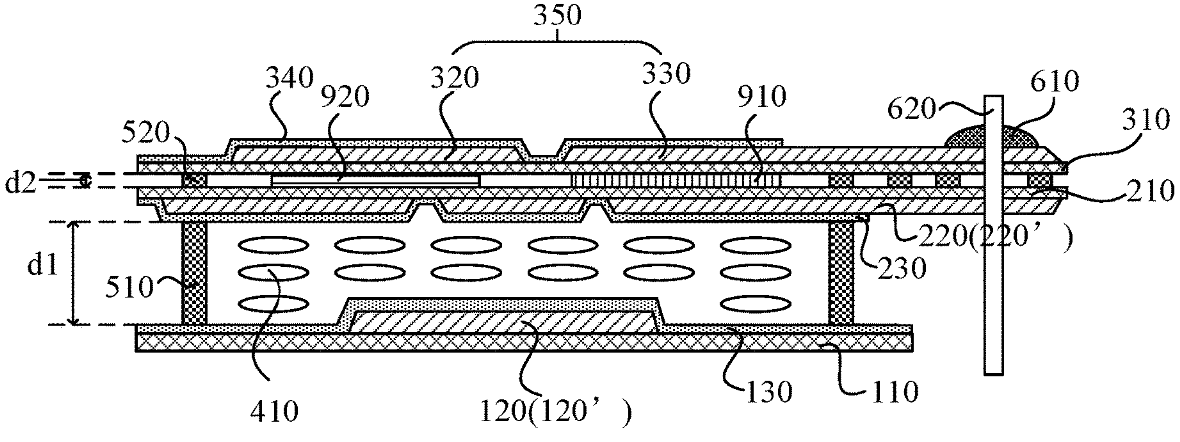
FIG. 15 is a structure view of another liquid crystal antenna according to embodiments of the present disclosure.

FIG. 15 is a structure view of another liquid crystal antenna according to embodiments of the present disclosure. Referring to FIG. 15, in one embodiment, optionally, the liquid crystal antenna further includes a second dielectric material layer 920. The second dielectric material layer 920 is located between the second substrate 210 and the third substrate 310. Moreover, the vertical projection of the second dielectric material layer 920 on the third substrate 310 overlaps the radiation pattern block 320. The dielectric constant of the first dielectric material layer 910 is larger than the dielectric constant of the second dielectric material layer 920. This configuration, on the basis of meeting the requirements of the radiation pattern block 320 for the medium substrate and the requirements of the feed pattern block 330 for the medium substrate, enables the first dielectric material layer 910 and the second dielectric material layer 920 to support the second box-shaped structure evenly.

Each preceding embodiment exemplarily shows the solution in which the second substrate 210 and the third substrate 310 are each longer than the first substrate 110, which is not intended to limit the present disclosure. In other embodiments, the length of each substrate may be set as needed.

FIG. 16 is a structure view of another liquid crystal antenna according to embodiments of the present disclosure. Referring to FIG. 16, in one embodiment, optionally, the first substrate 110 and the second substrate 210 are equal in size, one end of the third substrate 310 protrudes from the second substrate 210, and a part of the third substrate 310 protruding from the second substrate 210 is configured to weld the antenna connector 620.

Optionally, the thickness of the second substrate 210 is in the range of 50 um to 1.5 mm, for example, 50 um, 70 um, 90 um, 1.1 mm, 1.3 mm or 1.5 mm. The thickness of the third substrate 310 is in the range of 50 um to 1.5 mm, for example, 50 um, 70 um, 90 um, 1.1 mm, 1.3 mm or 1.5 mm. Accordingly, compared with the related art, the second substrate 210 and the third substrate 310 can be relatively thin, thereby helping reduce the thickness of the liquid crystal antenna and enhance the performance of the antenna.

To sum up, in a first aspect, in the embodiments of the present disclosure, only one side of the second substrate 210 is provided with the grounding layer 220', and only one side of the third substrate 310 is provided with the feed pattern block 330 and the radiation pattern block 320. That is, a conductive pattern layer is disposed on each of a single side of the second substrate 210 and a single side of the third substrate 310. Compared with the method of manufacturing a grounding layer, a feed pattern block and a radiation pattern block sequentially on both sides of the same substrate in the related art, this method greatly simplifies the manufacturing process, reduces process difficulty, and reduces the manufacturing cost.

In a second aspect, in the embodiments of the present disclosure, the second space is disposed between the second substrate 210 and the third substrate 310 to form the second box-shaped structure so that particles in the environment is prevented from being interspersed between the second substrate 210 and the third substrate 310 in the manufacturing process to cause a protrusion or a bulge, the third substrate 310 is prevented from being adversely affected by an uneven surface of the second substrate 210, and the second substrate 210 is prevented from being adversely affected by an uneven surface of the third substrate 310.

In a third aspect, in the embodiments of the present disclosure, different dielectric material layers can be provided corresponding to the radiation pattern block 320 and the feed pattern block 330 respectively in the second box-shaped structure as needed, thereby meeting the requirements of the radiation pattern block 320 for the medium substrate and the requirements of the feed pattern block 330 for the medium substrate. Thus on the basis of helping enhance the radiation efficiency of the radiation pattern block 320 of the liquid crystal antenna, reduce antenna losses and enhance the gain, this configuration enhances the ability of the medium substrate of the feed pattern block 330 confining the electric field, mitigates electromagnetic leakage, reduces the size of the feed pattern block 330, and improves the capability of miniaturization.

Accordingly, compared with the related art, the embodiments of the present disclosure reduce the manufacturing difficulty of the liquid crystal antenna, enhance the performance of the liquid crystal antenna, and improve the yield.

Figure 18:
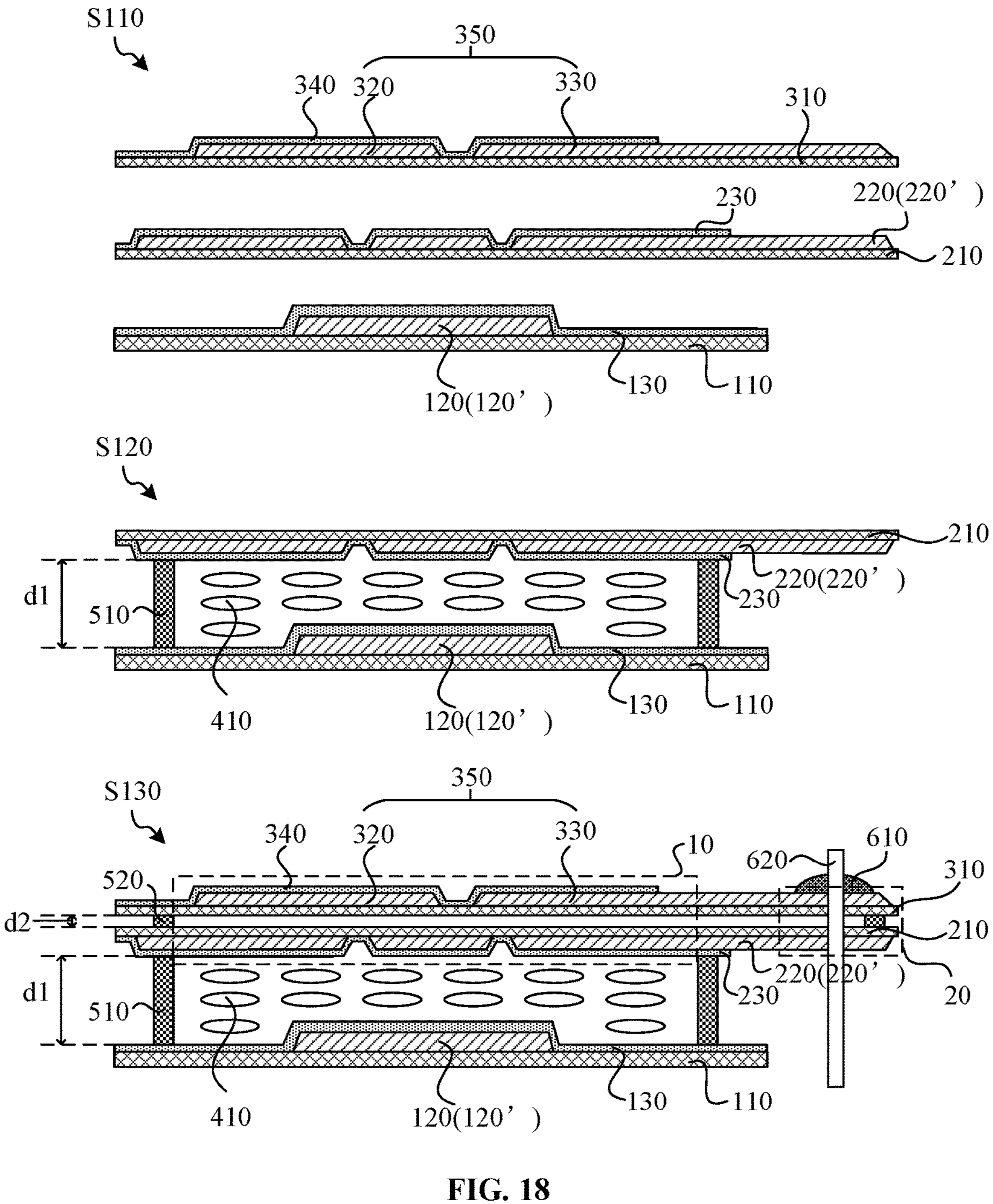
FIG. 18 is a structure view showing steps of the method for manufacturing a liquid crystal antenna according to embodiments of the present disclosure.

Embodiments of the present disclosure further provide a method for manufacturing a liquid crystal antenna that can be used for manufacturing the liquid crystal antenna provided in any embodiment of the present disclosure. FIG. 17 is a flowchart of a method for manufacturing a liquid crystal antenna according to embodiments of the present disclosure. FIG. 18 is a structure view showing steps of the method for manufacturing a liquid crystal antenna according to the embodiments of the present disclosure. Referring to FIGS. 17 and 18, the method for manufacturing a liquid crystal antenna includes steps S110 to S130.

In S110, a first substrate 110, a second substrate 210 and a third substrate 310 are provided.

A second conductive pattern layer 220 is disposed on a single side of the second substrate 210. A third conductive pattern layer 350 is disposed on a single side of the third substrate 310. Exemplarily, a phase-shifting layer 120' and a first protective layer 130 are disposed on the first substrate 110. The first substrate 110 may be made of, for example, glass. The phase-shifting layer 120' may be made of, for example, copper. The first protective layer 130 may be made of, for example, silicon nitride or silicon oxide. The manufacturing process of the phase-shifting layer 120' may include a deposition process and an etching process, steps of which include: first, a first electrode material layer is deposited on the first substrate 110 through a deposition process, for example, chemical vapor deposition or physical vapor deposition; then the first electrode material layer is patterned through an etching process, for example, dry etching or wet etching, so as to form the phase-shifting layer 120'.

Similarly, a grounding layer 220' and a second protective layer 230 are disposed on the second substrate 210. A radiation pattern block 320, a feed pattern block 330 and a third protective layer 340 are disposed on the third substrate 310. The material and manufacturing process of the second substrate 210 as well as the material and manufacturing process of the third substrate 310 are similar to the manufacturing process of the first substrate 110 and the manufacturing process of each layer structure on the first substrate 110, which are not repeated here.

In S120, the first substrate 110 and the second substrate 210 are made into a box to constitute a first box-shaped structure.

A first space is disposed between the first substrate 110 and the second substrate 210. The first space is filled with a liquid crystal layer 410. In the process in which the first substrate 110 and the second substrate 210 form the first box-shaped structure, a first support piece 510 is disposed in the first space. The first support piece 510 is configured to support the first substrate 110 and the second substrate 210 and seal the liquid crystal layer 410 to prevent the liquid crystal layer 410 from overflowing.

In S130, the second substrate 210 and the third substrate 310 are made into a box to constitute a second box-shaped structure.

A second space is disposed between the second substrate 210 and the third substrate 310 so that the second conductive pattern layer 220 on the second substrate 210 is separated from the third conductive pattern layer 350 on the third substrate 310. In the process of forming the second box-shaped structure, a support structure including a frame sealant 520 is provided to support the second substrate 210 and the third substrate 310 so as to form the second space.

Optionally, after the second substrate 210 is aligned with the third substrate 310 to form the second box-shaped structure, the method for manufacturing a liquid crystal antenna may further include evacuating the second space to keep the second space in a vacuum state, helping reduce the dielectric constant of the second space and thus enhancing the performance of the liquid crystal antenna. Optionally, after the second substrate 210 and the third substrate 310 are made into a box to constitute the second box-shaped structure, the method for manufacturing a liquid crystal antenna may further include disposing an antenna connector 620 and a pad 610 on one end of the feed pattern block 330 facing away from the radiation pattern block 320. A first end of the antenna connector 620 is connected to the feed pattern block 330 and is fixed through the pad 610. A second end of the antenna connector 620 is configured to be connected to an external circuit, for example, a high-frequency connector.

In the embodiments of the present disclosure, the manufacturing of the liquid crystal antenna is completed through S110 to S130. The second conductive pattern layer 220 is disposed on a single side of the second substrate 210. The third conductive pattern layer 350 is disposed on a single side of the third substrate 310. The second substrate 210 and the third substrate 310 are made into a box to constitute the second box-shaped structure. This configuration is equivalent to using the second box-shaped structure to replace the structure of forming conductive pattern layers on both sides of the same substrate in the related art. Accordingly, the embodiments of the present disclosure avoid the process of manufacturing conductive pattern layers on both sides of the same substrate, thereby reducing the manufacturing difficulty, reducing the cost and improving the yield. Moreover, compared with the configuration in which the second substrate 210 is directly attached to the third substrate 310, the second space is disposed between the second substrate 210 and the third substrate 310, helping prevent the phenomenon such as a protrusion or a bulge from being generated on a substrate surface due to the manufacturing process or environment, thereby enhancing the reliability and manufacturing quality of the liquid crystal antenna. To sum up, the embodiments of the present disclosure help reduce the manufacturing difficulty of the liquid crystal antenna and improve the yield.

Figure 19:
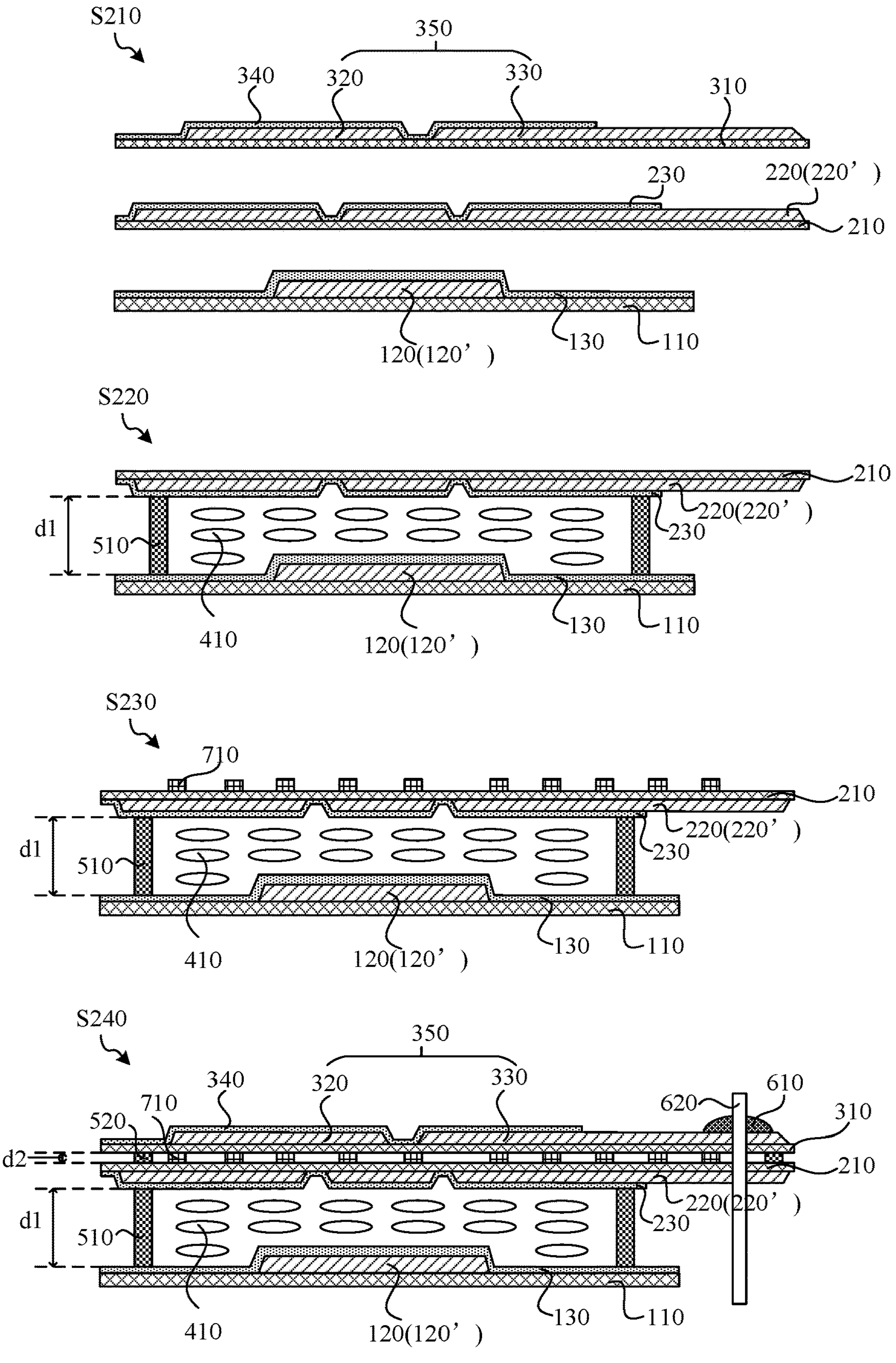
FIG. 19 is a structure view showing steps of another method for manufacturing a liquid crystal antenna according to embodiments of the present disclosure.

FIG. 19 is a structure view showing steps of another method for manufacturing a liquid crystal antenna according to embodiments of the present disclosure. Referring to FIG. 19, optionally, the method for manufacturing a liquid crystal antenna includes steps S210 to S240.

In S210, a first substrate 110, a second substrate 210 and a third substrate 310 are provided. A second conductive pattern layer 220 is disposed on a single side of the second substrate 210. A third conductive pattern layer 350 is disposed on a single side of the third substrate 310.

In S220, the first substrate 110 and the second substrate 210 are made into a box to constitute a first box-shaped structure. A first space is disposed between the first substrate 110 and the second substrate 210. The first space is filled with a liquid crystal layer 410.

In S230, support structures 710 are formed on the second substrate 210 or the third substrate 310 so that the support structures 710 are located in a second space A first end of each support structure 710 abuts against the second substrate 210 or the third substrate 310. The tops of the support structures 710 have the same height so as to ensure a second end of each support structure 710 abuts against the third substrate 310 or the second substrate 210 when the second substrate 210 is aligned with the third substrate 310 to form a second box-shaped structure. This configuration is equivalent to providing multiple fixed points in the second box-shaped structure, enabling the second space at each position of the second box-shaped structure to keep constant, thereby enhancing the stability of the second box-shaped structure, helping prevent the performance of the liquid crystal antenna from being adversely affected by the collapse and deformation of the second box-shaped structure during the use of the liquid crystal antenna, and helping prevent the radiation performance of the liquid crystal antenna from being adversely affected by the defect of a small protrusion generated on the second substrate 210 or the third substrate 310.

Optional shapes, materials and arrangement positions of the support structures 710 are multiple. Optionally, the support structures 700 are support columns. The process of forming the support structures 710 includes forming the base materials of the support columns on the second substrate 210 and then forming the support columns through the photolithography process. The support columns may be located outside an antenna coupling region of third substrate 310. This configuration, on the basis of ensuring the support effect, may ensure that the vertical projections of the support structures 710 on the second substrate 210 do not overlap the vertical projection of the antenna coupling region of the third substrate 310 on the second substrate 210. It may be that the projections of the support structures 710 on the second substrate 210 do not overlap the projection of the feed pattern block 330 on the second substrate 210 or the projection of the radiation pattern block 320 on the second substrate 210, preventing the support structures 710 from blocking a signal and enhancing the performance of the antenna.

In S240, the second substrate 210 and the third substrate 310 are made into a box to constitute a second box-shaped structure.

The second space is disposed between the second substrate 210 and the third substrate 310 so that the second conductive pattern layer 220 on the second substrate 210 is separated from the third conductive pattern layer 350 on the third substrate 310.

In the embodiments of the present disclosure, the manufacturing of the liquid crystal antenna is completed through S210 to S240. The support structures 710 disposed in the second space can enable the second space to keep stable, reducing the manufacturing difficulty of the liquid crystal antenna, helping prevent the performance of the liquid crystal antenna from being adversely affected by the collapse and deformation of the second box-shaped structure during the use of the liquid crystal antenna, and helping prevent the radiation performance of the liquid crystal antenna from being adversely affected by the defect of a small protrusion generated on the second substrate 210 or the third substrate 310. Thus, the performance and stability of the liquid crystal antenna is improved.

What is claimed is:

1. A liquid crystal antenna, comprising a first substrate, a second substrate and a third substrate that are sequentially stacked, wherein the first substrate and the second substrate constitute a first box-shaped structure, a first conductive pattern layer is disposed on a side of the first substrate close to the second substrate, a first space is disposed between the first substrate and the second substrate, and the first space is filled with a liquid crystal layer; and the second substrate and the third substrate constitute a second box-shaped structure, a second conductive pattern layer is disposed on only one side of the second substrate, a third conductive pattern layer is disposed on only one side of the third substrate, and a second space is disposed between the second substrate and the third substrate to form the second box-shaped structure.

2. The liquid crystal antenna according to claim 1, wherein the second space is evacuated, or the second space is filled with air.

3. The liquid crystal antenna according to claim 1, further comprising a support structure, wherein the support structure is disposed in the second space, a first end of the support structure abuts against the second substrate, and a second end of the support structure abuts against the third substrate.

4. The liquid crystal antenna according to claim 3, wherein the support structure comprises at least one of a support ball, a support column, or a frame sealant mixed support ball.

5. The liquid crystal antenna according to claim 4, wherein the support structure is the support column or the frame sealant mixed support ball; and the second conductive pattern layer on the second substrate comprises at least one opening, the at least one opening is configured to couple an antenna signal so that the antenna signal is transmitted between the first substrate and the third substrate, and a vertical projection of the support structure on the second substrate does not overlap the at least one opening.

6. The liquid crystal antenna according to claim 3, wherein the second box-shaped structure comprises a liquid crystal overlapping region and a wiring region, the wiring region protrudes from the first box-shaped structure, and the wiring region is configured to weld an antenna connector; and the support structure is disposed in at least one of the liquid crystal overlapping region or the wiring region.

7. The liquid crystal antenna according to claim 1, wherein the second box-shaped structure comprises a liquid crystal overlapping region and a wiring region, the wiring region protrudes from the first box-shaped structure, and the wiring region is configured to weld an antenna connector; and the liquid crystal antenna further comprises a frame sealant configured to seal the second box-shaped structure, wherein the frame sealant surrounds the liquid crystal overlapping region, or the frame sealant surrounds the liquid crystal overlapping region and the wiring region.

8. The liquid crystal antenna according to claim 7, wherein a part of the frame sealant surrounds the liquid crystal overlapping region, and a part of the frame sealant adheres the second substrate and the third substrate that are located in the wiring region.

9. The liquid crystal antenna according to claim 1, wherein the first substrate and the second substrate are equal in size, one end of the third substrate protrudes from the second substrate, and a part of the third substrate protruding from the second substrate is configured to weld an antenna connector.

10. The liquid crystal antenna according to claim 1, wherein the third conductive pattern layer on the third substrate comprises a plurality of conductive pattern blocks insulated from each other, and the third substrate comprises a hollow portion; and the hollow portion is located in a region between two adjacent ones of the plurality of conductive pattern blocks, or the hollow portion is located between an edge of the third substrate and the plurality of conductive pattern blocks.

11. The liquid crystal antenna according to claim 1, wherein the second conductive pattern layer on the second substrate is located on one side of the second substrate facing away from the third substrate, and the third conductive pattern layer on the third substrate is located on one side of the third substrate facing away from the second substrate; or the second conductive pattern layer on the second substrate is located on one side of the second substrate facing away from the third substrate, and the third conductive pattern layer on the third substrate is located on one side of the third substrate facing the second substrate; or the second conductive pattern layer on the second substrate is located on one side of the second substrate facing the third substrate, and the third conductive pattern layer on the third substrate is located on one side of the third substrate facing the second substrate; or the second conductive pattern layer on the second substrate is located on one side of the second substrate facing the third substrate, and the third conductive pattern layer on the third substrate is located on one side of the third substrate facing away from the second substrate.

12. The liquid crystal antenna according to claim 1, wherein the first conductive pattern layer on the first substrate is a phase-shifting layer;

the second conductive pattern layer on the second substrate is a grounding layer, the grounding layer comprises a first opening and a second opening, and both a vertical projection of the first opening on the first substrate and a vertical projection of the second opening on the first substrate overlap the phase-shifting layer; and the third conductive pattern layer on the third substrate comprises a feed pattern block and a radiation pattern block, wherein the feed pattern block is electrically connected to an antenna connector, a vertical projection of the feed pattern block on the first substrate overlaps a vertical projection of the first opening on the first substrate, the radiation pattern block is configured to radiate or receive an antenna signal, and a vertical projection of the radiation pattern block on the first substrate overlaps a vertical projection of the second opening on the first substrate.

13. The liquid crystal antenna according to claim 12, further comprising a first dielectric material layer, wherein the first dielectric material layer is located between the second substrate and the third substrate, a vertical projection of the first dielectric material layer on the third substrate overlaps the feed pattern block, and the vertical projection of the first dielectric material layer on the third substrate does not overlap the radiation pattern block.

14. The liquid crystal antenna according to claim 13, wherein a material of the first dielectric material layer comprises at least one of ceramic or lead zirconate titanate.

15. The liquid crystal antenna according to claim 13, wherein a first recess is disposed at a position of the second substrate corresponding to the feed pattern block, or the first recess is disposed at a position of the third substrate corresponding to the feed pattern block; and the first dielectric material layer is embedded in the first recess, a dielectric constant of the first dielectric material layer is larger than a dielectric constant of the second substrate, and the dielectric constant of the first dielectric material layer is larger than a dielectric constant of the third substrate.

16. The liquid crystal antenna according to claim 12, further comprising a first dielectric material layer and a second dielectric material layer, wherein a dielectric constant of the first dielectric material layer is larger than a dielectric constant of the second dielectric material layer, wherein the first dielectric material layer is located between the second substrate and the third substrate, and a vertical projection of the first dielectric material layer on the third substrate overlaps the feed pattern block; and the second dielectric material layer is located between the second substrate and the third substrate, and a vertical projection of the second dielectric material layer on the third substrate overlaps the radiation pattern block.

17. The liquid crystal antenna according to claim 12, wherein the third substrate is a glass substrate, a high-frequency substrate, a ceramic substrate, a polyimide substrate or a liquid crystal polymer substrate.

18. The liquid crystal antenna according to claim 1, wherein a thickness of the second substrate is in a range of 50 um to 1.5 mm, and a thickness of the third substrate is in a range of 50 um to 1.5 mm.

19. A method for manufacturing a liquid crystal antenna, comprising providing a first substrate, a second substrate and a third substrate that are sequentially stacked, wherein a first conductive pattern layer is disposed on a side of the first substrate close to the second substrate, a second conductive pattern layer is disposed on only one side of the second substrate, and a third conductive pattern layer is disposed on only one side of the third substrate;

making the first substrate and the second substrate into a box to constitute a first box-shaped structure, wherein a first space is disposed between the first substrate and the second substrate, and the first space is filled with a liquid crystal layer; and making the second substrate and the third substrate into a box to constitute a second box-shaped structure, wherein a second space is disposed between the second substrate and the third substrate to form the second box-shaped structure so that the second conductive pattern layer on the second substrate is separated from the third conductive pattern layer on the third substrate.

20. The method for manufacturing a liquid crystal antenna according to claim 19, before making the second substrate and the third substrate into the box, further comprising:

forming a support structure on the second substrate or the third substrate so that the support structure is located in the second space.

* * * * *